(12) United States Patent
Chen et al.

(10) Patent No.: US 8,879,270 B2
(45) Date of Patent: Nov. 4, 2014

(54) RACK MOUNTABLE SERVER APPARATUS

(75) Inventors: Ko-Wei Chen, Taipei (TW); Yung-Jung Du, Taipei (JP)

(73) Assignee: Pegatron Corporation, Taipei (TW)

( * ) Notice: Subject to any disclaimer, the term of this patent is extended or adjusted under 35 U.S.C. 154(b) by 251 days.

(21) Appl. No.: 13/475,053

(22) Filed: May 18, 2012

(65) Prior Publication Data

US 2012/0293947 A1 Nov. 22, 2012

(30) Foreign Application Priority Data

May 19, 2011 (TW) .............................. 100209015 U

(51) Int. Cl.
*H05K 7/20* (2006.01)
*G06F 1/18* (2006.01)

(52) U.S. Cl.
CPC ................ *G06F 1/181* (2013.01); *G06F 1/183* (2013.01)
USPC ...... 361/724; 361/679.33; 361/725; 361/727; 312/223.1; 312/223.2

(58) Field of Classification Search
None
See application file for complete search history.

(56) References Cited

U.S. PATENT DOCUMENTS

| | | | | |
|---|---|---|---|---|
| 5,877,938 A | * | 3/1999 | Hobbs et al. | 361/724 |
| 6,621,713 B2 | | 9/2003 | Amaike | |
| 6,654,252 B2 | * | 11/2003 | Raynham | 361/727 |
| 7,236,370 B2 | * | 6/2007 | Coglitore et al. | 361/724 |
| 7,245,632 B2 | * | 7/2007 | Heffernan et al. | 370/465 |
| 7,327,563 B2 | * | 2/2008 | Cauthron | 361/679.55 |
| 7,903,403 B2 | | 3/2011 | Doll | |
| 8,369,092 B2 | * | 2/2013 | Atkins et al. | 361/727 |
| 2003/0033361 A1 | * | 2/2003 | Garnett et al. | 709/203 |
| 2008/0180896 A1 | * | 7/2008 | McClure et al. | 361/683 |

* cited by examiner

*Primary Examiner* — Anthony Q Edwards
(74) *Attorney, Agent, or Firm* — Muncy, Geissler, Olds & Lowe, P.C.

(57) ABSTRACT

A rack mountable server apparatus is disposed on a plane of a rack. The rack mountable server apparatus includes a chassis and a plurality of server units. The chassis is disposed in the rack, and the appearance of the chassis is a rectangular cuboid. When the chassis is installed in the rack, a first surface constructed by a length and a width of the chassis is parallel to the plane. The server units are disposed in the chassis. Each of server units has a circuit board, and the circuit boards are arranged parallel to a second surface which is constructed by the length and the height of the chassis or the width and the height of the chassis, and are perpendicular to the first surface.

7 Claims, 4 Drawing Sheets

RACK MOUNTABLE SERVER APPARATUS

CROSS REFERENCE TO RELATED APPLICATIONS

This Non-provisional application claims priority under 35 U.S.C. §119(a) on Patent Application No(s). 100209015 filed in Taiwan, Republic of China on May 19, 2011, the entire contents of which are hereby incorporated by reference.

BACKGROUND OF THE INVENTION

1. Technology Field

The disclosure relates to a server apparatus and, in particular, to a rack mountable server apparatus including vertically arranged server units.

2. Related Art

In the recent years, the computer technology has been rapidly developed, so that the personal computers, such as desktop or laptop computers, are widely used in various fields. Due to the progress of communication technology, the conventional business mode has been replaced gradually by the worldwide electronic business. Thus, the enterprise electronization is the main stream of the world, so that the servers with specific functions have been provided for different electronization requirements.

As shown in FIG. 1, a conventional server apparatus 1 includes a chassis 11, four server units 12, and two power supply modules 13. The height of the chassis 11 is 2 U (U is a scale unit used in this server field), and 1 U is equal to 1.75 inches. The server units are horizontally arranged in the chassis 11, and the power supply modules 13 are disposed adjacent to the server units 12 for providing necessary power to the server units 12.

The rack of the server system for the current cloud products has the standard scale of 42 U, 48 U or 84 U. In other words, if the scale of the race is 42 U, 21 servers 1 can be installed in the race. However, if the server units 12 of the server 1 are arranged in horizontal, the amount of the server units 12 accommodated in the rack can not reach the maximum. Thus, the performance, energy consumption, and price of the server system can not be the optimum, and can not fit the requirement and trend for eco and environmental protection.

SUMMARY

The disclosure is to provide a rack mountable server apparatus that increases the density of server units so as to enhance the performance and decrease the power consumption.

The embodiment of the present invention discloses a rack mountable server apparatus disposed on a plane of a rack. The rack mountable server apparatus comprises a chassis and a plurality of server units. The chassis is disposed in the rack, and the appearance of the chassis is a rectangular cuboid. When the chassis is installed in the rack, a first surface constructed by a length and a width of the chassis is parallel to the plane. The server units are disposed in the chassis. Each of server units has a circuit board, and the circuit boards are arranged parallel to a second surface constructed by the length and height of the chassis or the width and height of the chassis, and are perpendicular to the first surface.

In one embodiment, the rack mountable server apparatus further comprises a plurality of power supply modules, a plurality of fan modules and a plurality of storage modules. The power supply modules are electrically connected with the server units, the fan modules are electrically connected with the power supply modules, and the storage modules are electrically connected with the power supply modules.

In one embodiment, the power supply modules, fan modules and storage modules are disposed in the chassis and located adjacent to the server units. Herein, the storage modules are hard disk drives.

In one embodiment, the height of the chassis is larger than or equal to 7 inches.

In one embodiment, each of the server units has a plurality of processors and a plurality of memories. Herein, the memories are registered dual in-line memory modules (RDIMM).

In one embodiment, the circuit boards of adjacent two of the server units are disposed in contrary to each other in the chassis.

As mentioned above, in the rack mountable server apparatus of the present invention, the circuit boards of the server units are arranged parallel to the second surface constructed by the length and height of the chassis or the width and height of the chassis, and are perpendicular to the first surface constructed by the length and width of the chassis. Accordingly, the density of the server units can be increased so as to enhance the performance and decrease the power consumption.

These and other features, aspects and advantages of the present invention will become better understood with regard to the following description, appended claims, and accompanying drawings.

DETAILED DESCRIPTION

Figure 1:
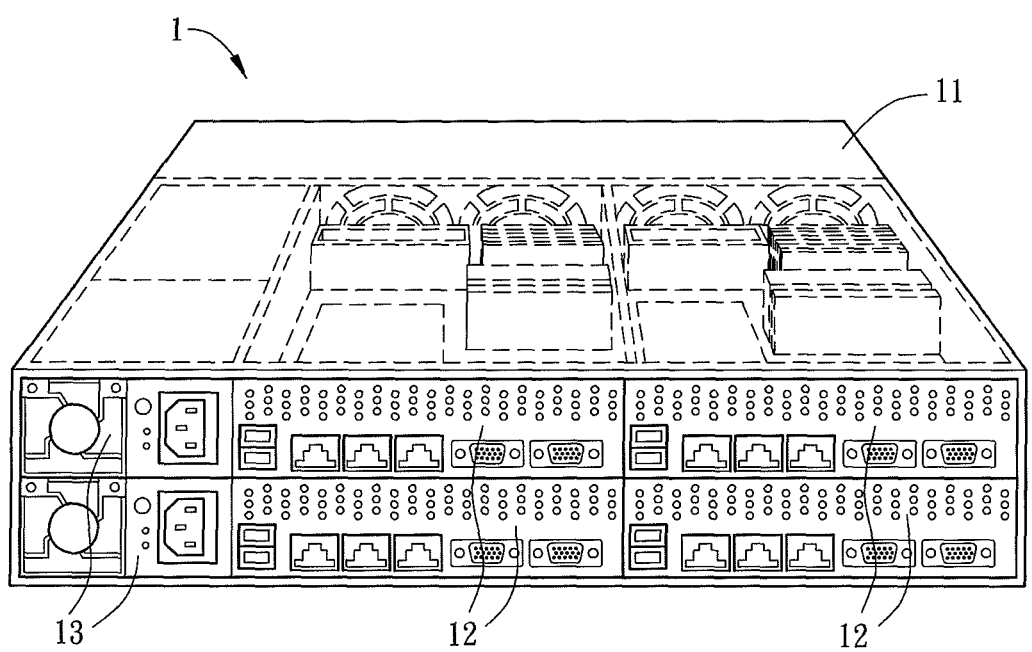
FIG. 1 is a schematic diagram showing a conventional server apparatus.
Figure 2:
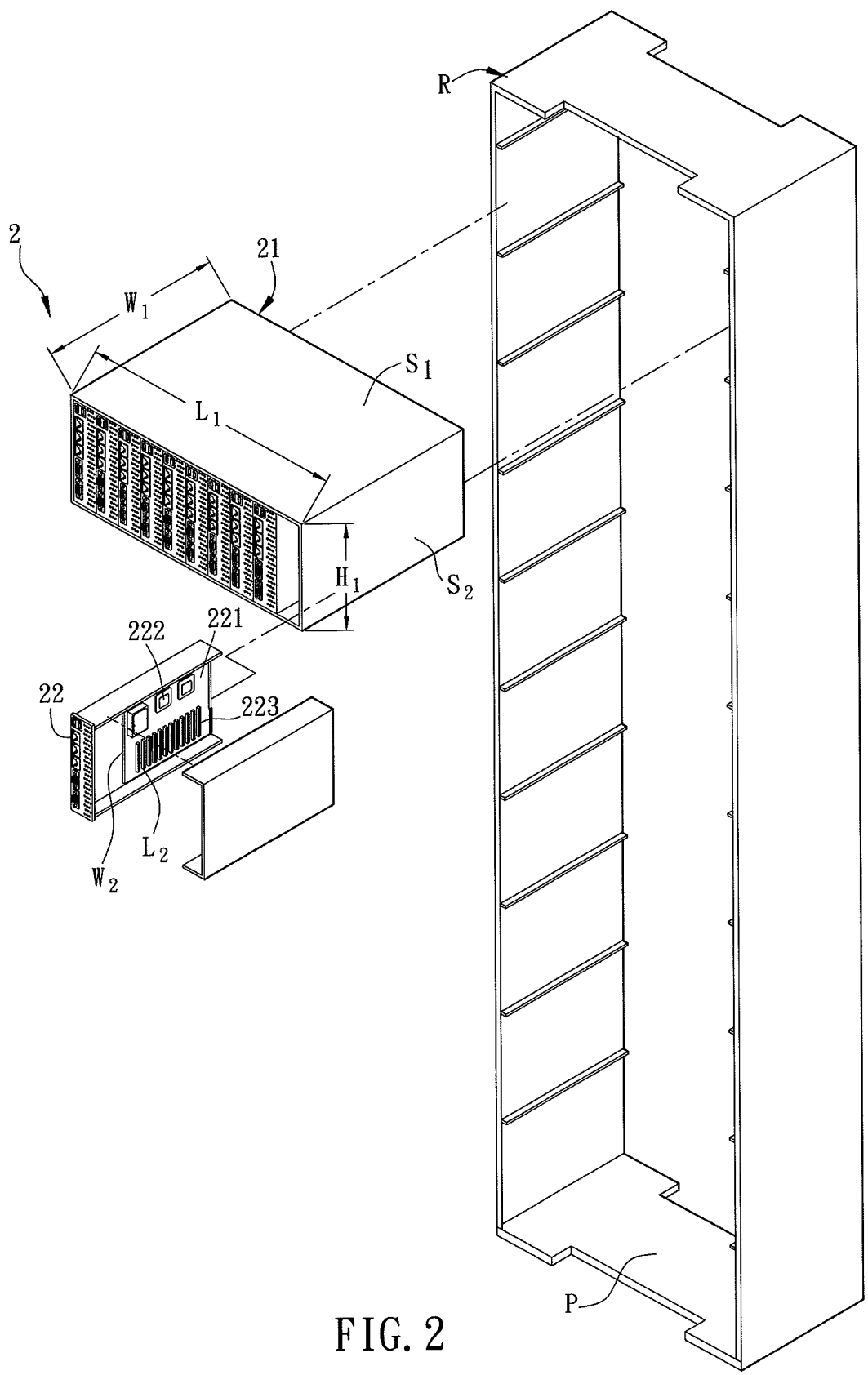
FIG. 2 is a schematic diagram showing a rack mountable server apparatus according to an embodiment of the present invention.

FIG. 2 is a schematic diagram showing a rack mountable server apparatus 2 cooperated with a rack R according to an embodiment of the present invention. Referring to FIG. 2, the rack mountable server apparatus 2 is disposed on a plane P of the rack R so as to form a server system. The rack mountable server apparatus 2 comprises a chassis 21 and a plurality of server units 22.

The chassis 21 is a frame with the appearance of rectangular cuboid. The length $L_1$ of the chassis 21 is larger than the width $W_1$ of the chassis 21, and the width $W_1$ of the chassis 21 is larger than the height $H_1$ of the chassis 21. In this embodiment, the height $H_1$ is equal to, for example but not limited to, 4 U. In practice, the scale of the height $H_1$ of the chassis 21 may be different depending on the actual demands and designs. For example, the height $H_1$ of the chassis 21 may be equal to 4 U, 5 U, 6 U or 8 U. In other words, the height $H_1$ of the chassis 21 is larger than or equal to 7 inches.

The chassis 21 is installed in the rack R, and a first surface $S_1$ constructed by the length $L_1$ and the width $W_1$ of the chassis 21 is parallel to the plane P of the rack R. In practice, the chassis 21 can slide into the rack R through the rails (not shown) or stopper (not shown) inside the rack R.

The server units 22 are disposed inside the chassis 21, and each server unit 22 has a circuit board 221. In practice, the circuit board 221 of the server unit 22 is, for example, a half-width server circuit board (node). That is, the length $L_2$ of the circuit board 221 is larger than the width $W_2$ thereof, and the size of the width $W_2$ is half-width. "Half-width" is a common scale unit in the server field, which means the length between 6.3 inches and 6.6 inches. In addition, each server unit 22 has two processor 222 and twelve memories 223, which are disposed on the circuit board 221. The memories 224 are registered dual in-line memory modules (RDIMM).

In this embodiment, the server units 22 are disposed inside the chassis 21 in order, and the circuit boards 221 of the server units 22 are arranged parallel to a second surface $S_2$ constructed by the width $W_1$ and the height $H_1$ of the chassis 21, and are perpendicular to the first surface $S_1$ constructed by the length $L_1$ and the width $W_1$ of the chassis 21. The chassis 21 can install ten vertically arranged server units 22. Regarding to the conventional server apparatus 1, the height thereof is only 2 U, which is smaller than the height of the rack mountable server apparatus 2, but the server apparatus 1 can accommodate 4 server units 12. In other words, when two server apparatuses 1 are stacked to form a height of 4 U, they can accommodate totally 8 server units 12, which are less than the maximum amount of server units 22 that can be accommodated in the rack mountable server apparatus 2. Under condition with the height of 4 U, the rack mountable server apparatus 2 can install two more server units 22 that the stacked server apparatuses 1. Thus, under the circumstance of the same thickness of chassis, the rack mountable server apparatus 2 can install more processes and memories, thereby enhancing the performance of the rack mountable server apparatus 2. Accordingly, when the server units 22 are vertically disposed on the first surface $S_1$ of the chassis 21, the rack mountable server apparatus 2 can have better arrangement density and performance.

In more detailed, the scale of the rack R is 42 U, so the rack R can install totally 10 server apparatuses 2. In other words, the rack R can accommodate 100 server units 22 including 200 processors 223 and 2400 memories 224. In the conventional art, although the rack R can install totally 21 server apparatuses 1, it only accommodates 84 server units 12 including 168 processors and 2016 memories. Consequently, the rack mountable server apparatus 2 of this invention allows the rack R to reach better arrangement density and performance.

To be noted, in practice, the server units 22 can slide into the chassis 21 through the rails (not shown) or stopper (not shown) inside the chassis 21.

Figure 3:
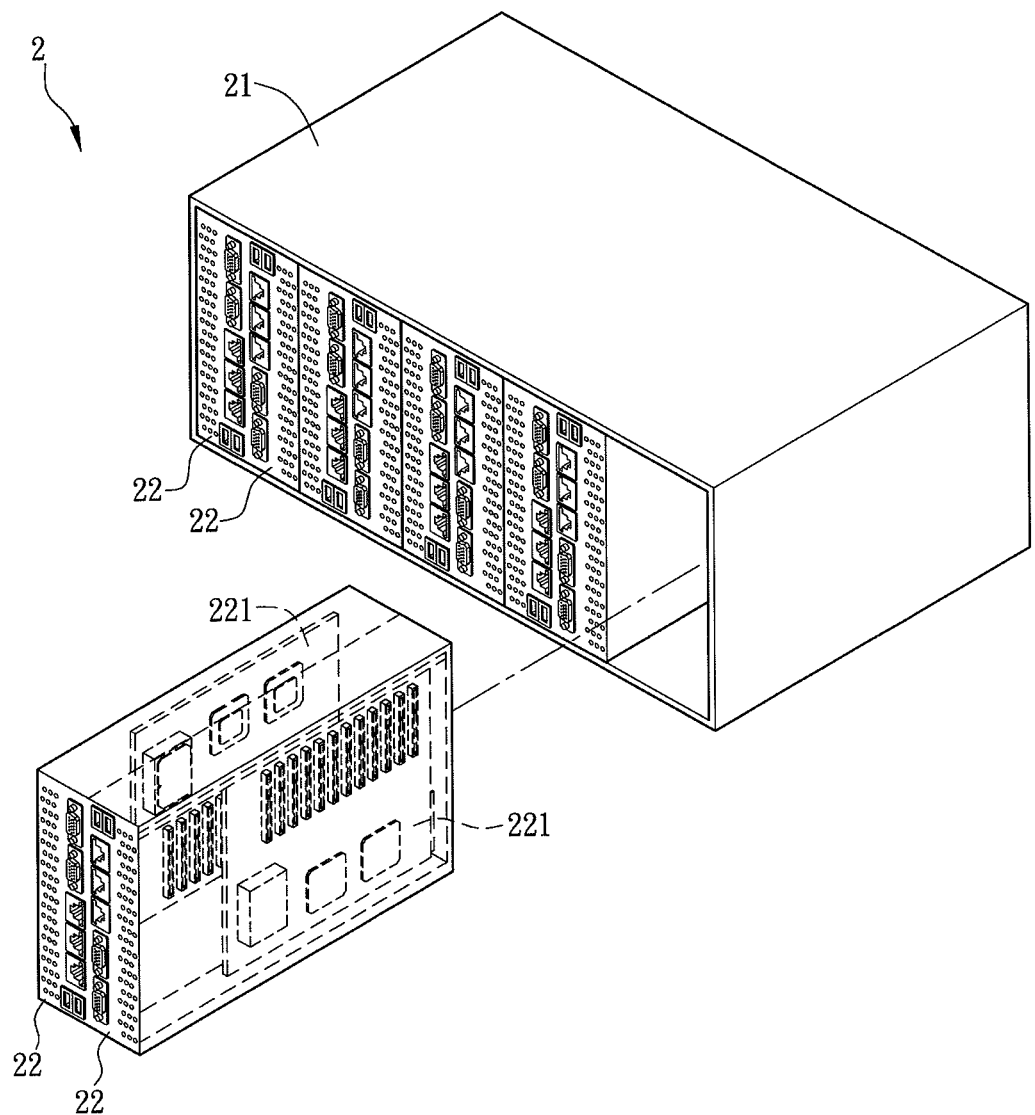
FIG. 3 is another schematic diagram showing the mountable server apparatus according to the embodiment of the present invention.

With reference to FIG. 3, in the rack mountable server apparatus 2 of this embodiment, two adjacent server units 22 are arranged in different vertical directions. That is, the circuit boards 221 of two adjacent server units 22 are disposed in contrary to each other in the chassis 21. In manufacturing, the opposite surfaces of two adjacent server units 22 can be removed and further to combine the two adjacent server units 22 so as to increase the arrangement density.

Figure 4:
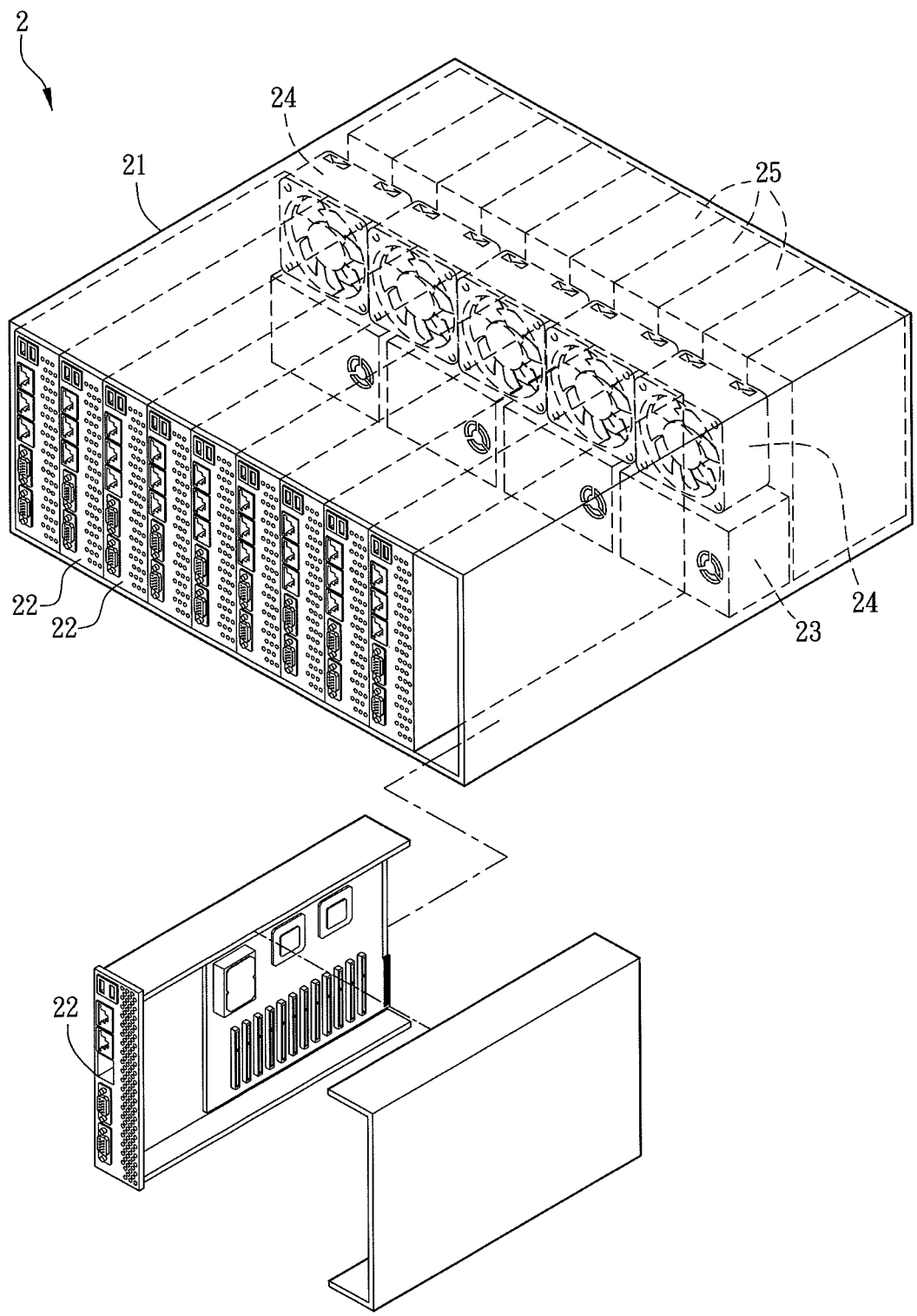
FIG. 4 is another schematic diagram showing the rack mountable server apparatus according to the embodiment of the present invention.

The rack mountable server apparatus 2 will be further described hereinafter with reference to FIG. 4. In this case, the rack mountable server apparatus 2 further comprises a plurality of power supply modules 23, a plurality of fan modules 24 and a plurality of storage modules 25. In this embodiment, the rack mountable server apparatus 2 further includes, for example but not limited to, four power supply modules 23, five fan modules 24 and ten storage modules 25.

The power supply modules 23 are electrically connected with the server units 22 for providing power to drive the server units 22. The fan modules 24 are electrically connected with the power supply modules 23 for adjusting the temperature of the server units 22. The storage modules 25 are electrically connected with the power supply modules 23 and the server units 22 for storing the necessary data of the server units 22. Herein, the storage modules 25 can be hard disk drives (HDD).

In this embodiment, the power supply modules 23, the fan modules 24 and the storage modules 25 are all disposed inside the chassis 21 and are located adjacent to the server units 22. In practice, the configurations and orders of the power supply modules 23, the fan modules 24 and the storage modules 25 can be changed based on the wiring or heat-dissipation factors. For example, the power supply modules 23, the fan modules 24 and the storage modules 25 can be respectively disposed on the bottom, top and back of the server units 22, or be together disposed on the bottom, top or back of the server units 22.

To sum up, in the rack mountable server apparatus of the present invention, the circuit boards of the server units are arranged parallel to the second surface constructed by the length and height of the chassis or the width and height of the chassis, and are perpendicular to the first surface constructed by the length and width of the chassis. Accordingly, the density of the server units can be increased so as to enhance the performance and decrease the power consumption.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A rack mountable server apparatus disposed on a plane of a rack, comprising:
    a chassis disposed in the rack, wherein the appearance of the chassis is a rectangular cuboid, and when the chassis is installed in the rack, a first surface constructed by a length and a width of the chassis is parallel to the plane; and
    a plurality of server units disposed in the chassis, wherein each of server units has a circuit board, and the circuit boards are arranged parallel to a second surface which is constructed by the length and a height of the chassis or the width and the height of the chassis, and are perpendicular to the first surface,
    wherein the circuit boards of adjacent two of the server units are disposed in contrary to each other in the chassis.

2. The rack mountable server apparatus of claim 1, further comprising:
    a plurality of power supply modules electrically connected with the server units;
    a plurality of fan modules electrically connected with the power supply modules; and
    a plurality of storage modules electrically connected with the power supply modules.

3. The rack mountable server apparatus of claim 2, wherein the power supply modules, the fan modules and the storage modules are disposed in the chassis and located adjacent to the server units.

4. The rack mountable server apparatus of claim 2, wherein the storage modules are hard disk drives.

5. The rack mountable server apparatus of claim 1, wherein the height of the chassis is larger than or equal to 7 inches.

6. The rack mountable server apparatus of claim 1, wherein each of the server units has a plurality of processors and a plurality of memories.

7. The rack mountable server apparatus of claim 6, wherein the memories are registered dual in-line memory modules.

\* \* \* \* \*